(12) United States Patent
Richardson

(10) Patent No.: US 7,240,403 B1
(45) Date of Patent: Jul. 10, 2007

(54) REMOVABLE HANDLES FOR A COOKING UTENSIL

(75) Inventor: John T. Richardson, Brooksville, FL (US)

(73) Assignee: Pearl Ann Richardson, Brooksville, FL (US)

( * ) Notice: Subject to any disclaimer, the term of this patent is extended or adjusted under 35 U.S.C. 154(b) by 167 days.

(21) Appl. No.: 11/121,470

(22) Filed: May 5, 2005

(51) Int. Cl.
*A47J 45/10* (2006.01)
*B62B 1/00* (2006.01)

(52) U.S. Cl. .................. 16/425; 16/110.1; 16/422

(58) Field of Classification Search .............. 16/900, 16/114 A, 436, 430, 438, 443, 422, 110.1, 16/415, 416, 412, 413, DIG. 19; 7/167, 7/109, 110; 294/152, 153, 158, 170, 9, 57; D7/323; 74/85, 340
See application file for complete search history.

(56) References Cited

U.S. PATENT DOCUMENTS

| | | | | | |
|---|---|---|---|---|---|
| 523,850 | A | * | 7/1894 | Cavanaugh | 7/109 |
| 3,761,120 | A | * | 9/1973 | Binkert | 294/8 |
| 3,908,225 | A | * | 9/1975 | Drilling et al. | 16/443 |
| 4,505,390 | A | * | 3/1985 | Kirk, Jr. | 206/547 |
| 4,555,125 | A | * | 11/1985 | Goodlove | 280/515 |
| 4,979,238 | A | * | 12/1990 | Clark | 4/246.1 |
| 5,314,220 | A | * | 5/1994 | Clement | 294/10 |
| 5,402,553 | A | * | 4/1995 | Goetz et al. | 16/413 |
| 5,823,589 | A | * | 10/1998 | Johnston | 294/7 |
| 6,658,701 | B1 | * | 12/2003 | DeHart et al. | 16/425 |
| 2006/0097529 | A1 | * | 5/2006 | White | 294/10 |

* cited by examiner

*Primary Examiner*—Jack W. Lavinder
*Assistant Examiner*—Andre' L. Jackson
(74) *Attorney, Agent, or Firm*—Rodgers & Rodgers

(57) ABSTRACT

A removable handle for a cooking utensil comprising a handle section and a utensil connecting section disposed parallel thereto and being interconnected by an intermediate section, a guide and locking pin extending from the free end of the utensil connecting section, and a stop extending from the utensil connecting section generally adjacent the intermediate section.

5 Claims, 1 Drawing Sheet

REMOVABLE HANDLES FOR A COOKING UTENSIL

BACKGROUND OF THE INVENTION

Cooking utensils for use in connection with conventional and microwave ovens and in particular a cooking basket or other receptacle intended for receiving large food items such as turkeys, roasts, etc. are widely used in both home and commercial applications. Of course, the food item to be cooked is simply placed in the cooking basket and transferred to the oven to be cooked for the appropriate cooking time. When the food item is fully cooked, the basket is removed from the oven wherein pot holders, a towel or other similar item must be employed to prevent burning of the user's hands. Of course, utilizing the conventional heat protection items is awkward and the possibility of the cooking basket slipping from the user's grip is always a possibility.

BRIEF SUMMARY OF THE INVENTION

Removable handles in combination with a cooking utensil wherein each removable handle comprises a handle section with a utensil connecting section disposed parallel thereto with these two sections being interconnected by means of an intermediate section. Each handle further comprises a guide and locking pin extending from one end of the utensil connecting section and a stop extending from the other end of the utensil connecting section. Each handle is adapted to cooperate with a handle receiving cylinder attached to each end of a generally rectangular cooking utensil and with each utensil connecting section being insertable into the respective handle receiving cylinder by means of the guide and locking pin being slidable in a slot formed in the handle receiving cylinder.

DETAILED DESCRIPTION OF THE INVENTION

Figure 1:
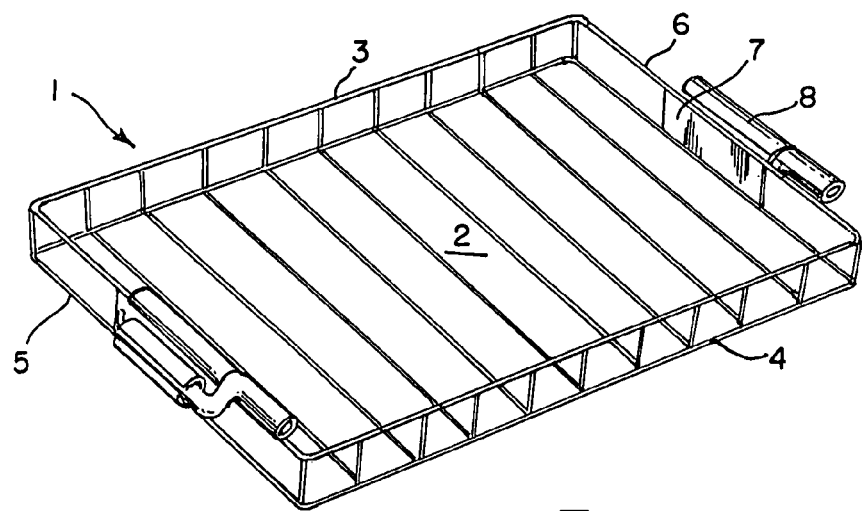
FIG. 1 is a perspective view of a conventional cooking basket with removable handles according to this invention.
Figure 2:
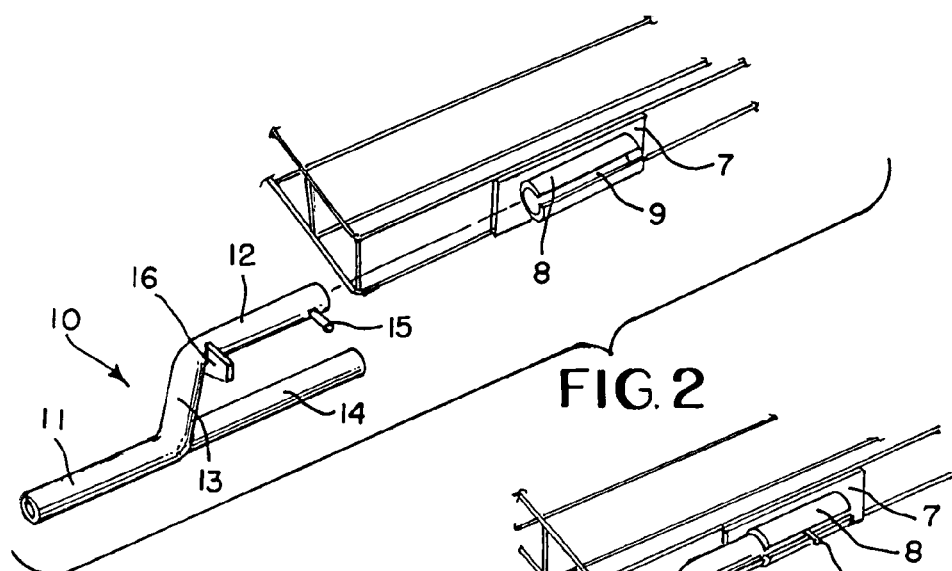
FIG. 2 is a perspective view showing one handle in the initial position.
Figure 3:
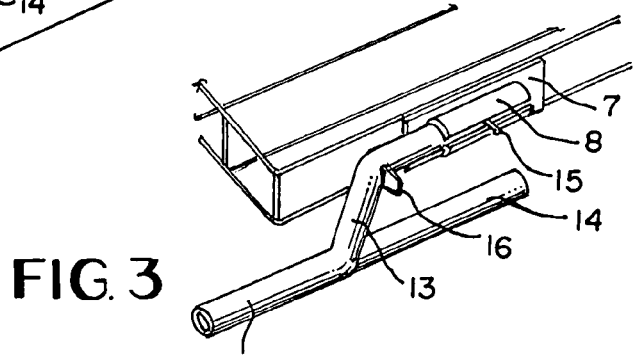
FIG. 3 is a perspective view showing one handle in the intermediate position.

In the drawing and with particular reference to FIG. 1, the numeral 1 designates a conventional food receptacle which is shown in the form of a cooking rectangular basket having base 2 with side walls 3 and 4 and end walls 5 and 6 upstanding therefrom. Of course, any conventional type of cookware could be utilized in accordance with this invention other than a cooking basket as shown in the drawing.

Since the removable handles, according to this invention, are identical in construction, only one handle and related structure will be discussed in detail. With reference to the drawings, attachment plate 7 is attached to end wall 6 with handle receiving cylinder 8 secured thereto by any suitable means such as welding. Slot 9 extends the entire length of handle receiving cylinder 8.

According to this invention, one of the removable handles is generally indicated by the numeral 10 and includes handle section 11 and utensil connecting section 12 disposed parallel thereto and with sections 11 and 12 being interconnected by means of intermediate section 13. In addition, supplemental handle 14 extends from the junction between handle section 11 and intermediate section 13 and is disposed generally coaxially with respect to handle section 11.

To complete the basic elements of removable handle 10, guide and locking pin 15 extends perpendicularly outward from the free end of utensil connecting section 12. In similar fashion, stop 16 extends outwardly from the connection between utensil connecting section 12 and intermediate section 13 and is disposed generally perpendicular to utensil connecting section 12.

In operation, removable handle 10 is inserted into handle receiving cylinder 8 by sliding utensil connecting section 12 into handle receiving cylinder 8 such that guide and locking pin 15 slides completely through slot 9. By this means, guide and locking pin 15 extends beyond the distal end of handle receiving cylinder 8 and stop 16 is disposed generally in abutting relation with the proximate end of handle receiving cylinder 8.

Following this, the user simply grasps handle section 11 of both removable handles 10 whereby the weight of cooking basket 1 and its contents causes each removable handle 10 to rotate inwardly of cooking basket 1. After cooking basket 1 is placed in the oven, the sequence of manipulation of removable handles 10 is simply reversed whereby removable handles 10 are rotated outwardly of cooking basket 1 such that removable handles 10 are withdrawn from cooking basket 1 by means of sliding guide and locking pin 15 completely through slot 9.

Figure 4:
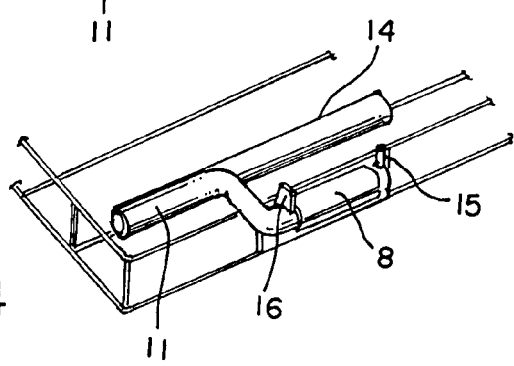
FIG. 4 is a perspective view showing one handle in the fully operational position.

Therefore, by this invention, a safe and secure method of inserting into and removing cooking utensils from an oven is facilitated. In addition, each removable handle 10 is locked in the operational position by means of guide and locking pin 15 being disposed in abutting relationship with the distal end of handle receiving cylinder 8, as shown in FIG. 4. Also, removable handles 10 are prevented from rotating inadvertently outwardly of cooking basket 1 simply by means of the weight of cooking basket 1 pulling downwardly on removable handles 10 thereby causing a tendency of removable handles 10 to rotate inwardly when cooking basket 1 is being lifted and transported. Finally, supplemental handles 14 can be utilized to lift and transport cooking basket 1 if it is desired to have a more centralized weight distribution of cooking basket 1 and its contents.

The invention claimed is:

1. A removable handle for a cooking utensil comprising an elongated handle section and an elongated utensil connecting section offset therefrom and being generally parallel thereto, an intermediate section having opposed ends, said handle section and said utensil connecting section being interconnected respectively to said opposed ends, guide and locking pin extending outwardly from said utensil connecting section remote from the associated one of said opposed ends, and wherein a stop extends outwardly from said utensil connecting section and is spaced from said guide and locking pin.

2. A removable handle for a cooking utensil according to claim 1 wherein a supplemental handle extends from the connection between said handle section and said intermediate section and extending generally coaxially with respect to said handle section.

3. A removable handle for a cooking utensil according to claim 1 wherein in combination a handle receiving cylinder is interconnected to said cooking utensil.

4. A removable handle for a cooking utensil according to claim 3 wherein a slot extends the length of said handle receiving cylinder.

5. A removable handle for a cooking utensil according to claim 3 wherein said handle receiving cylinder is attached to said cooking utensil by means of an attachment plate.

* * * * *